United States Patent [19]
Myers et al.

[11] Patent Number: 6,102,284
[45] Date of Patent: Aug. 15, 2000

[54] CRADLE FOR HOLDING A DEVICE

[75] Inventors: Kenneth E. Myers, Marietta; Charles A. Moore, Lawrenceville; Steven J. Meister, Atlanta; William Sims, Dunwoody, all of Ga.

[73] Assignee: LXE Inc., Norcross, Ga.

[21] Appl. No.: 08/841,496

[22] Filed: Apr. 23, 1997

[51] Int. Cl.[7] ..................................... G06F 17/00
[52] U.S. Cl. ..................... 235/375; 235/462.43
[58] Field of Search ................ 235/462.43, 462.01, 235/462.45, 472.01, 472.02; 382/313, 312, 314

[56] References Cited

U.S. PATENT DOCUMENTS

| | | | |
|---|---|---|---|
| 5,331,580 | 7/1994 | Miller et al. | 364/708.1 |
| 5,333,176 | 7/1994 | Burke et al. | 379/58 |
| 5,452,180 | 9/1995 | Register et al. | 361/686 |
| 5,479,001 | 12/1995 | Kumar | 235/472 |
| 5,484,991 | 1/1996 | Sherman et al. | 235/472 |
| 5,739,665 | 4/1998 | Bares | 320/2 |
| 5,796,091 | 8/1998 | Schmidt et al. | 235/472 |
| 5,808,285 | 9/1998 | Rockstein et al. | 235/472 |

*Primary Examiner*—Thien Minh Le
*Attorney, Agent, or Firm*—Jones & Askew, LLP

[57] ABSTRACT

A cradle for holding a wireless terminal. The cradle includes a lower spring-loaded leveling tray and an upper bracket including two spaced-apart retainers that allow one-handed access to the wireless terminal using an ergonomically safe push-down-and-tilt motion. Easy removal is enhanced by using an optical communication link between the cradle and the wireless terminal. The optical communication link allows an optional articulating keyboard to communicate with the wireless terminal when the wireless terminal is in the cradle. A battery charging terminal in the leveling tray charges the battery in the wireless terminal. The leveling tray is automatically locked when the wireless terminal is installed in the cradle. When the wireless terminal is in the cradle, a solenoid may be activated to open the lock. The cradle includes up to three ways to activate the solenoid to open the security lock: a password entered into the keyboard; a password entered into a four-button keypad on the cradle; and an application program that may be operated from the wireless terminal or from another terminal in the patient-care computer network. Alternatively, a manual keylock may operate the lock if another component of the locking system fails. The cradle also includes a dog that automatically locks the cradle when the wireless terminal is installed in the cradle, and that automatically keeps the cradle unlocked when the wireless terminal is removed from the cradle.

20 Claims, 10 Drawing Sheets

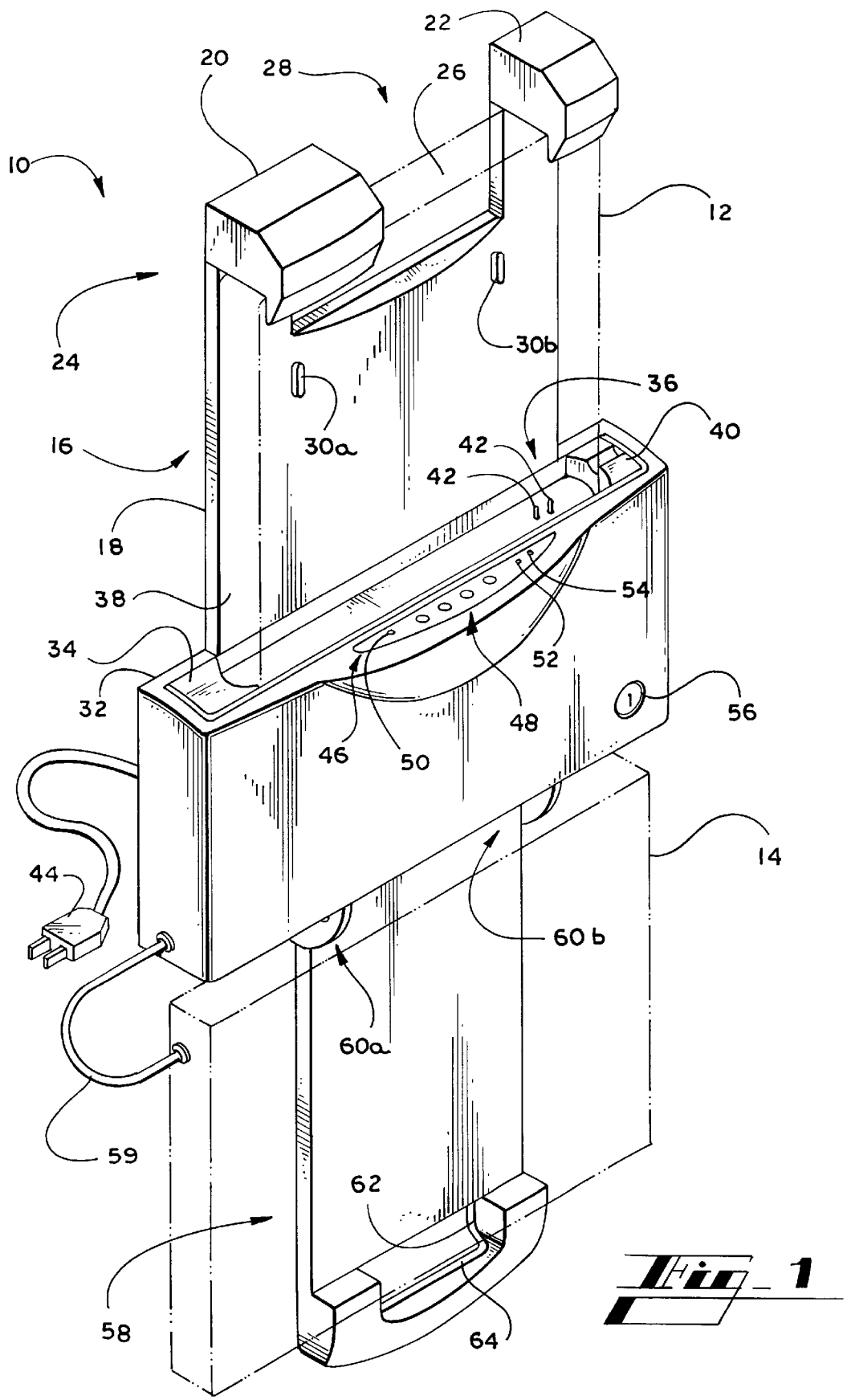
Fig_1

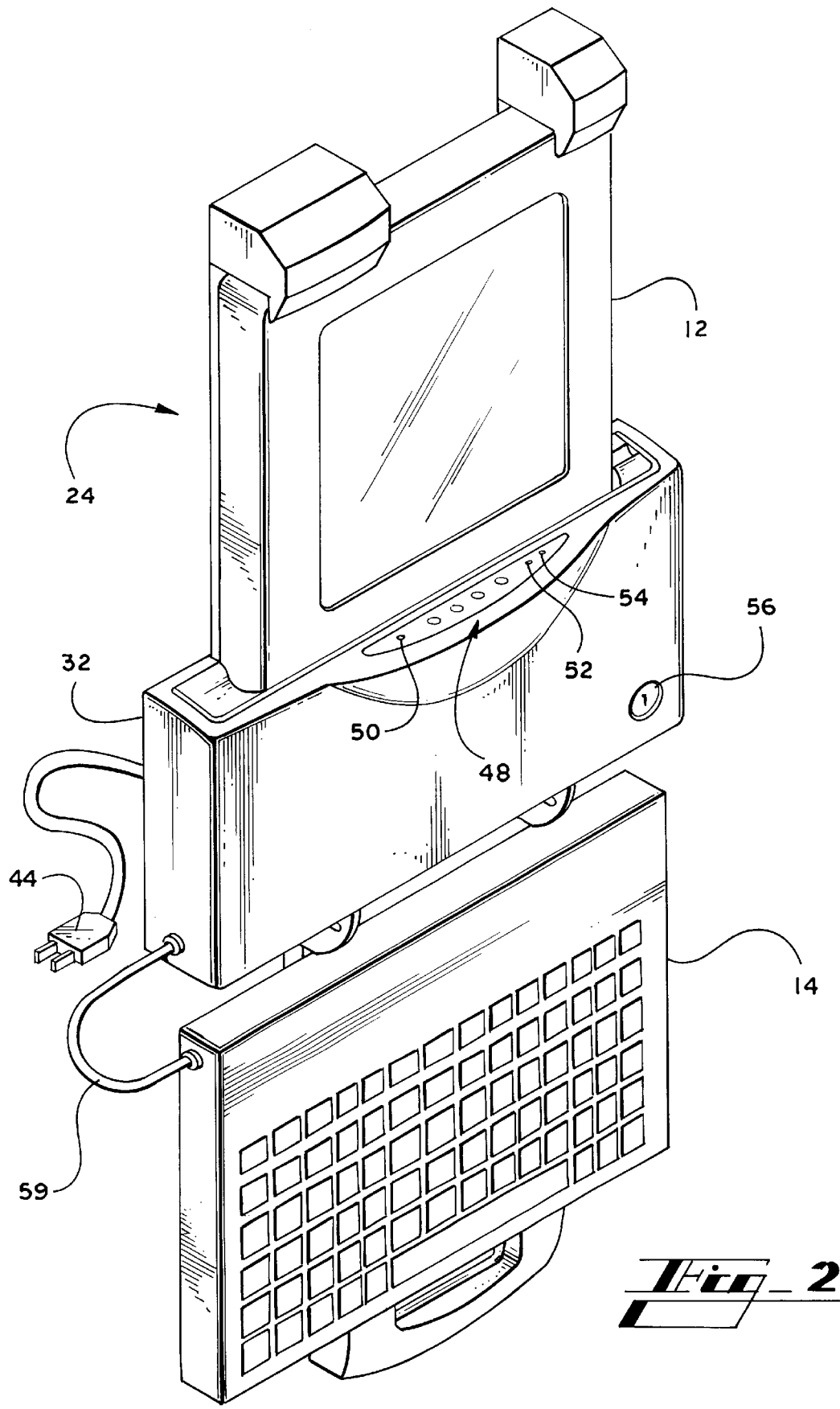
Fig_2

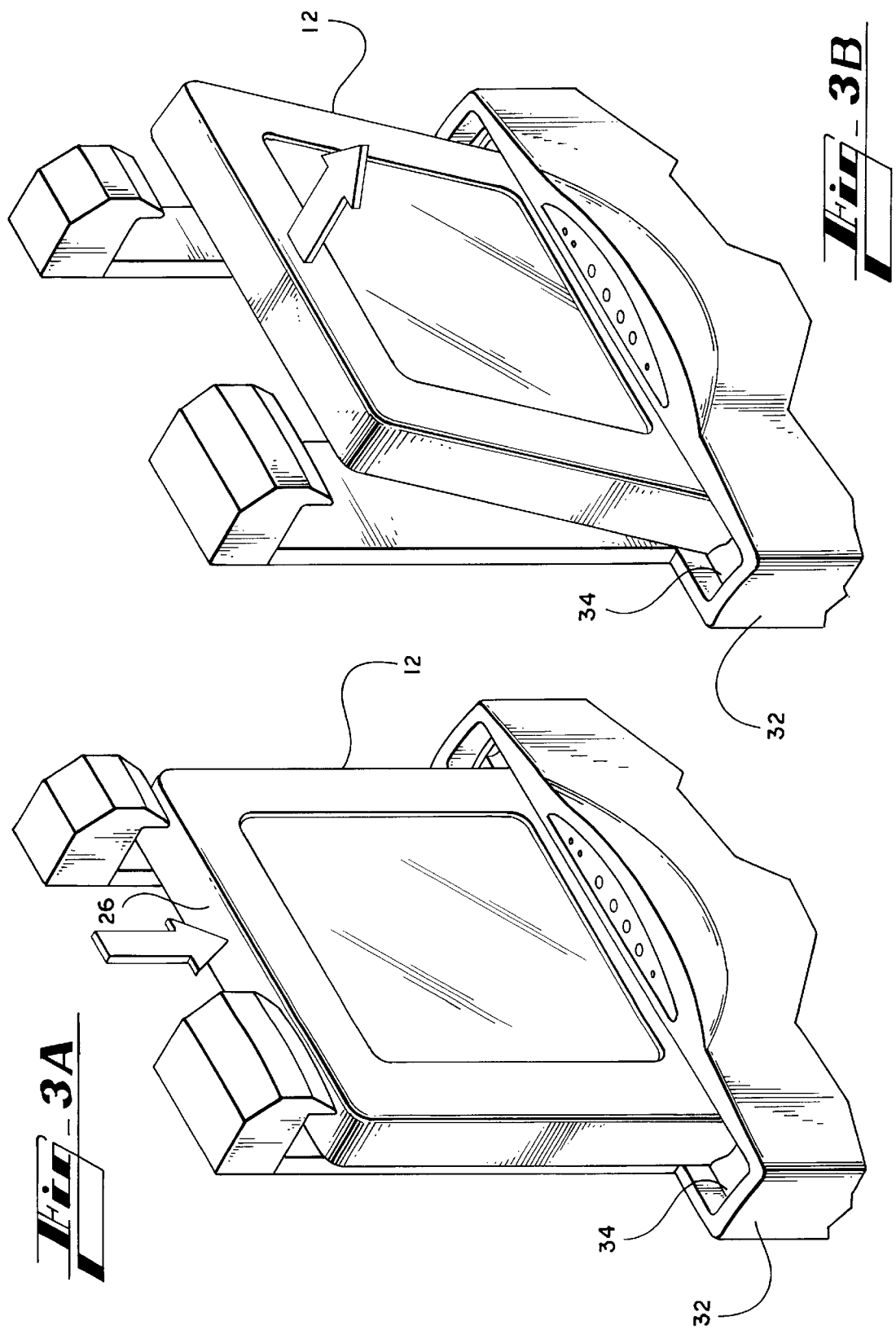

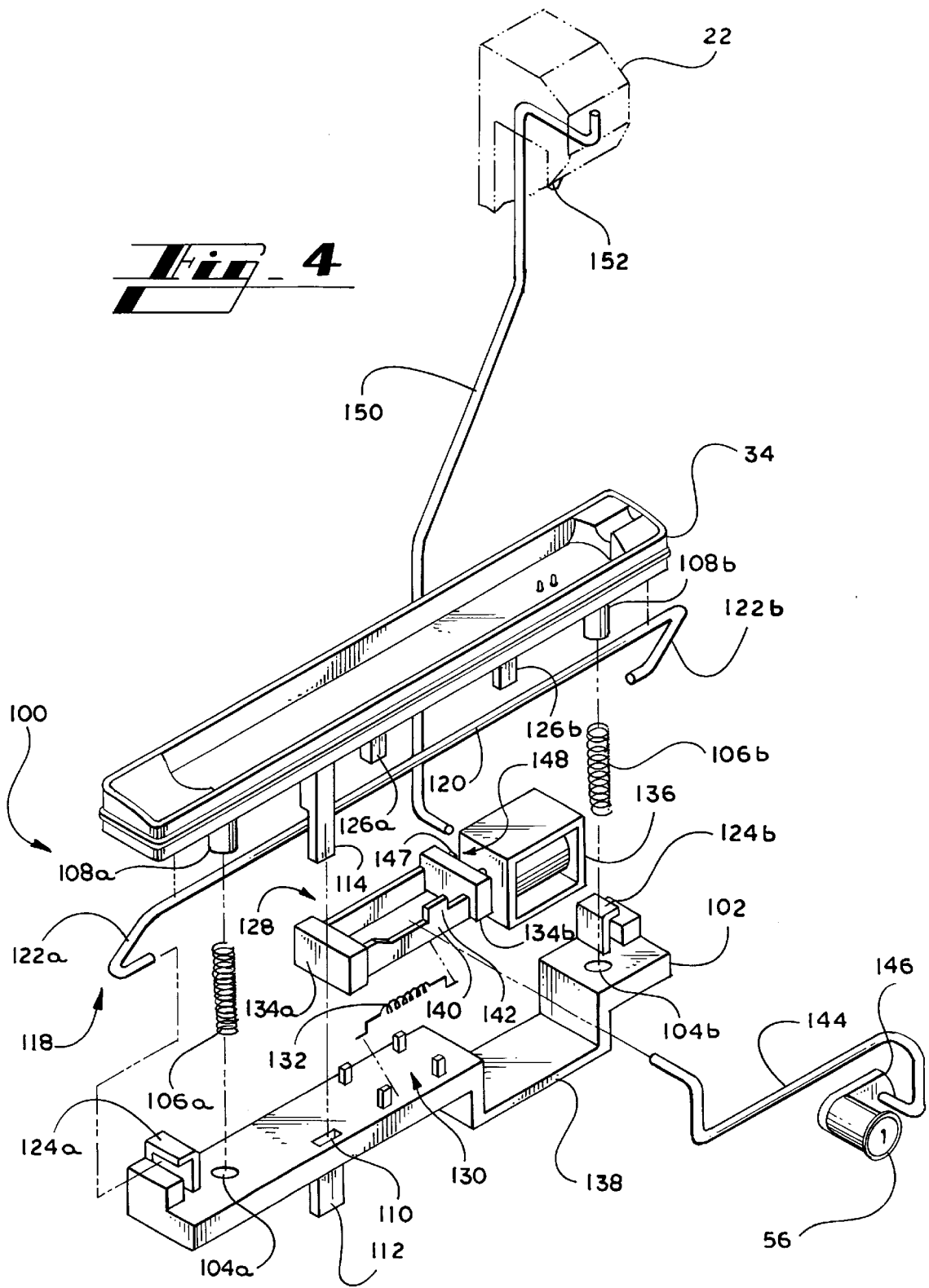

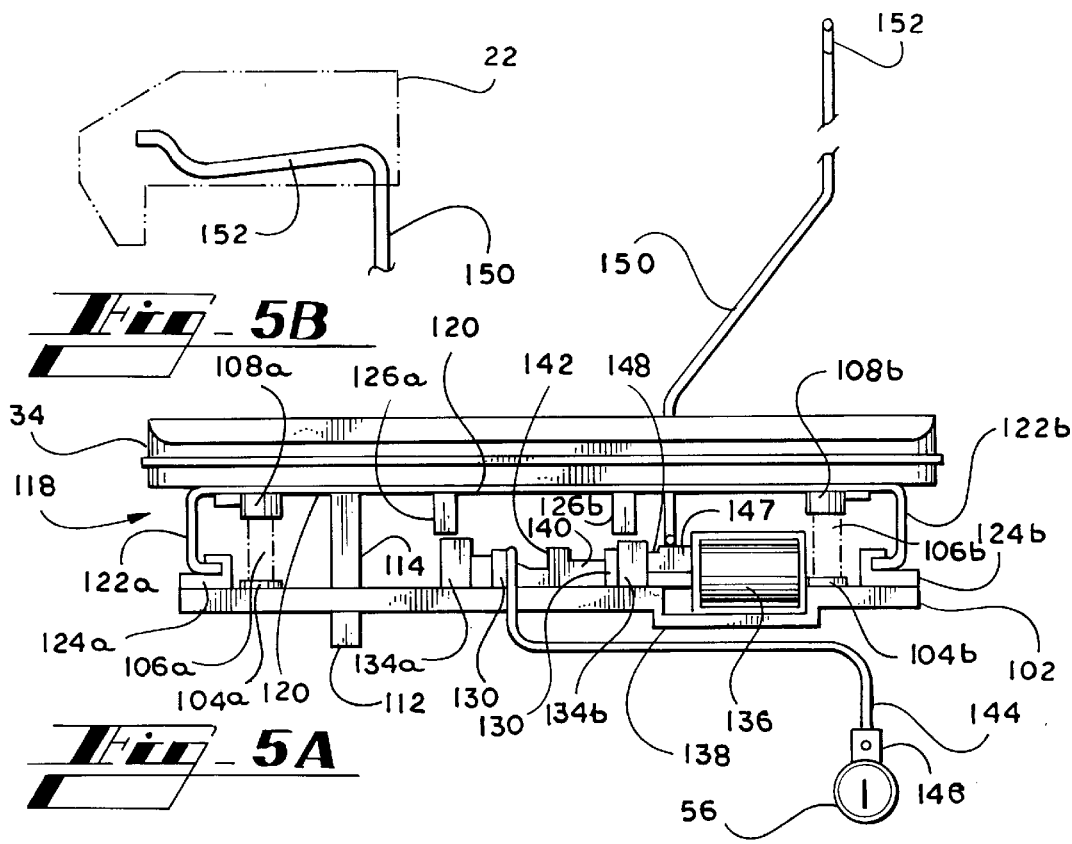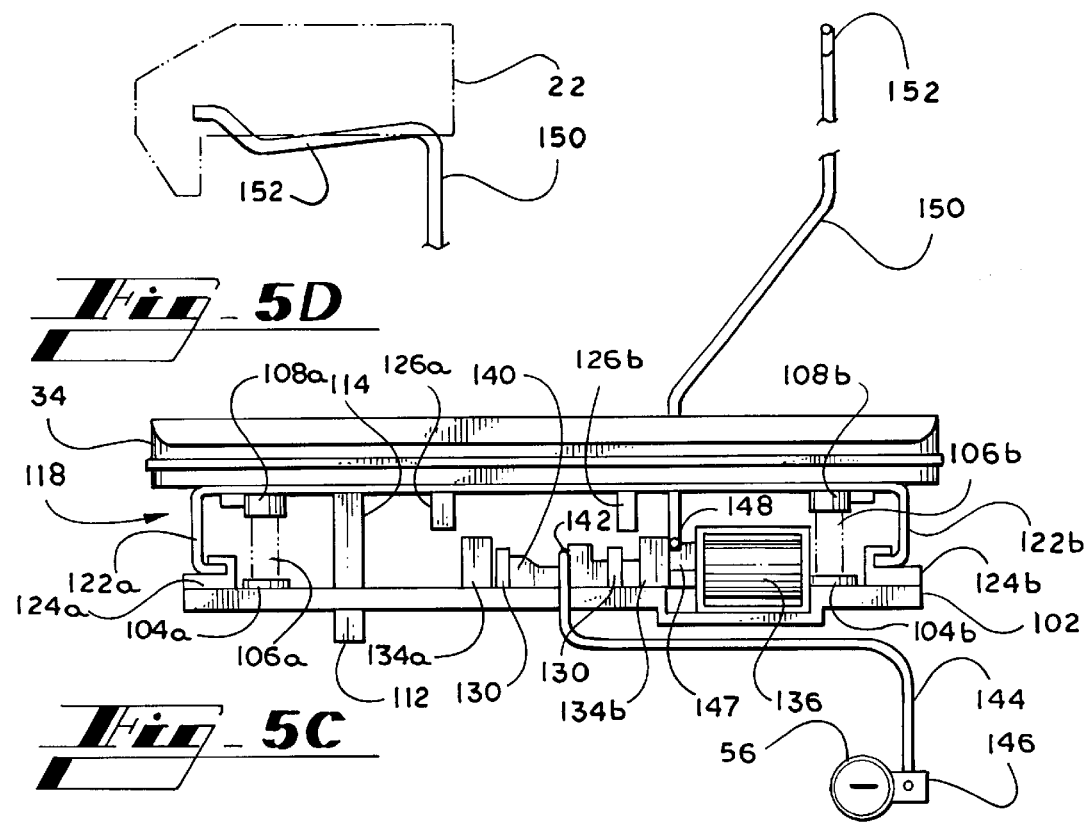

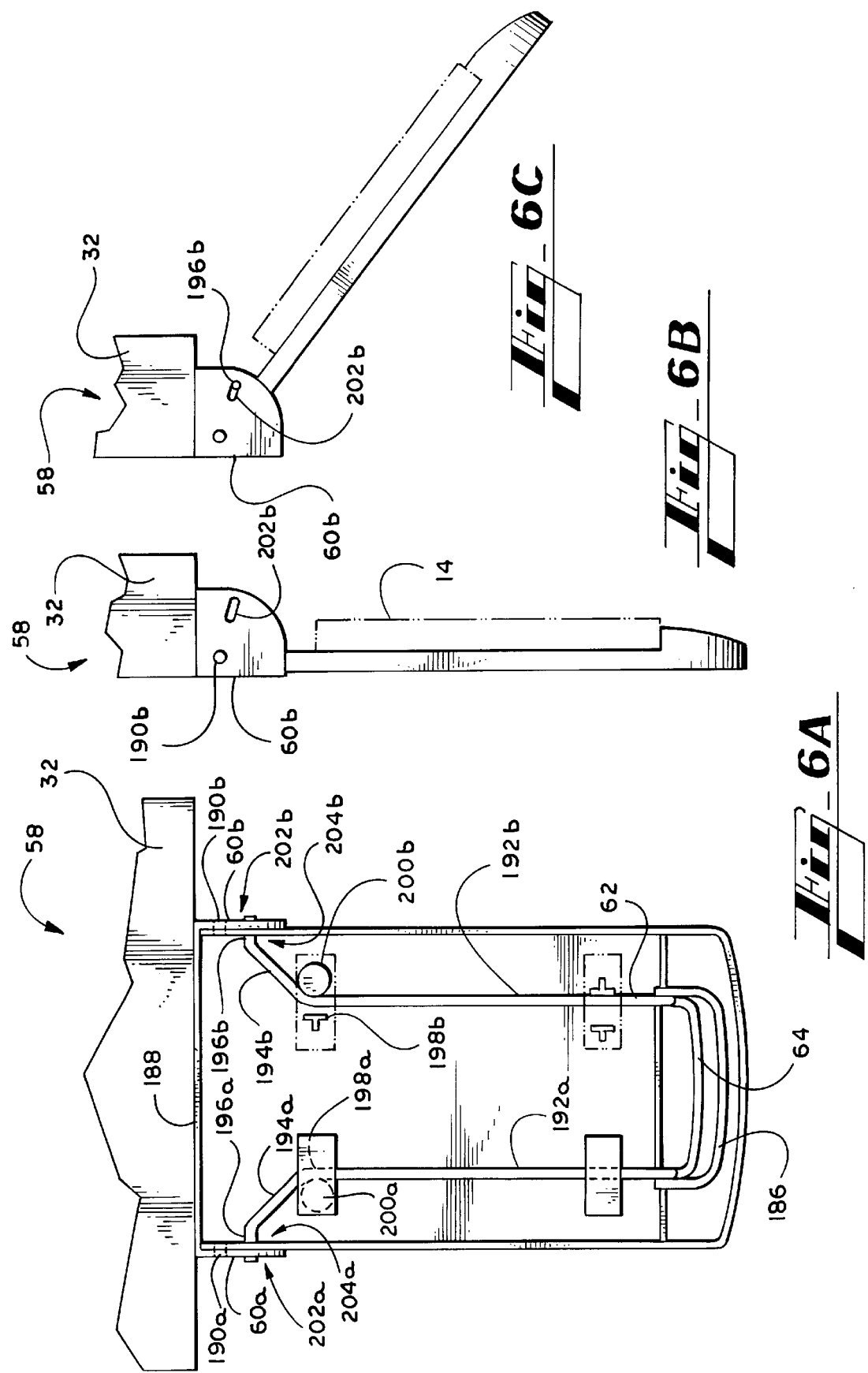

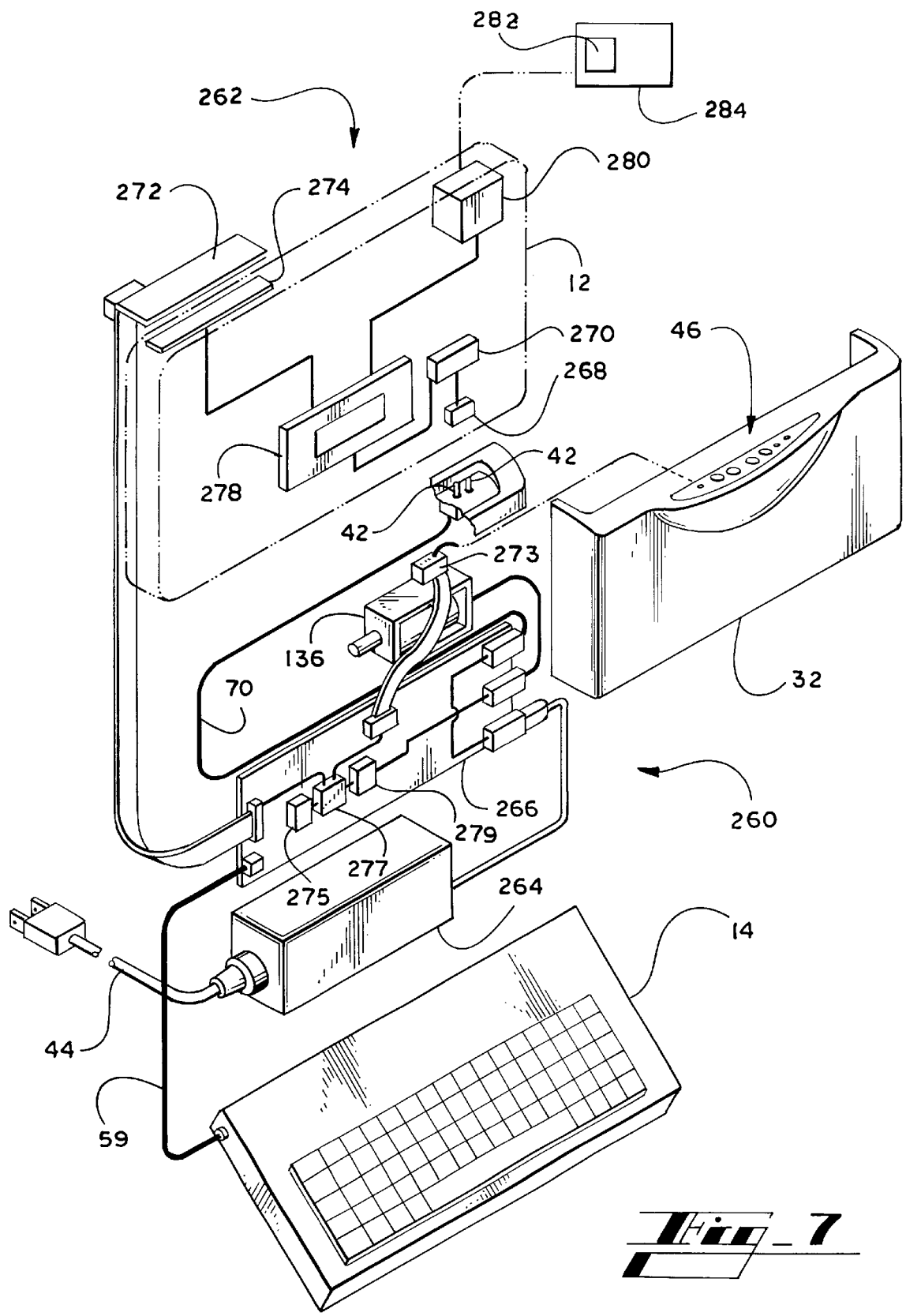

CRADLE FOR HOLDING A DEVICE

This application is related to U.S. application Ser. No. 08/839,039, entitled "Apparatus And Method For Supporting A Cradle"; and Ser. No. 29/069,763, entitled "Wall-Mounted Cradle", each filed on Apr. 23, 1997 and commonly assigned to LXE Inc., the assignee of the present application.

TECHNICAL FIELD

This invention relates to cradles for holding devices, such as wireless computer terminals. More particularly, the invention relates to a wall-mounted cradle including a bracket having two spaced-apart retainers and a leveling tray that allows the held device to be removed from the cradle with one hand.

BACKGROUND OF THE INVENTION

Wireless terminals may be deployed in many situations, but they are particularly well suited to medical care environments, such as a hospitals, clinics, nursing homes, and doctors' offices. Here, wireless terminals offer a great advantage by replacing the clipboard hanging from a patient's bed frame with a computer terminal that uses radio-frequency transmissions to communicate with a distributed computer network. These wireless terminals bring bed-side medical care into the information age by computerizing medical charts. They also make it much easier for a doctor to remotely monitor a patient's condition and alter care instructions.

In a medical care environment, a wireless terminal operates as part of a distributed patient-care computer network that might include computer resources and terminals located throughout a hospital system. This patient-care computer network might also extend to other hospital systems, the offices of the doctors that practice in the hospital, the offices of the insurance company, and so forth. A wireless terminal is typically used to post and record the information that was traditionally posted and recorded on a bed-side clipboard, such as the patient's prescriptions, vital signs, receipt of medications, scheduled tests, etc. This and other information is now automatically communicated between the wireless terminal and the distributed patient-care computer network.

As an example, consider a doctor who has patients in several different hospitals. The doctor may access the wireless terminals assigned to these patients by way of any terminal of the patient-care computer network, such as a terminal located at the doctor's home or office. In fact, the patient-care computer network might be remotely accessible from virtually any location, even a golf course or sailboat, using a cellular telephone and a laptop computer.

This type of patient-care computer network allows an off-site doctor to centrally access several wireless terminals that are in different locations without having to travel to the different locations or place telephone calls to on-site practitioners at the different locations. On-site practitioners, such as floor nurses and on-duty doctors, simply refer to a wireless terminal to learn of the off-site doctor's instruction for a patient. An on-site practitioner making the rounds usually picks-up the appropriate wireless terminal before visiting the patient and takes the terminal into the patient's room. The on-site practitioner then performs the indicated tasks and enters any relevant information into the wireless terminals, such as test results, vital signs, observations, and the like. The wireless terminal automatically transmits this information to the patient-care computer network, which the off-site doctor can later access to confirm that the instructions were carried out, further monitor the patient's condition and, if required, alter the care instructions. When the visit with the patient is over, the on-site practitioner typically returns the wireless terminal to its storage location.

Deploying a wireless terminal in this type of medical care environment presents several challenges. First, a wireless terminal assigned to a patient should be stored near the patient's hospital room for easy access by on-site medical practitioners. Second, the wireless terminal should be kept secure to prevent theft or tampering. Third, the wireless terminal should be easily accessible with one hand because a medical practitioner often has the other hand occupied with another item, such as a tray of medications, a tray of food, or the like. Fourth, a battery inside the wireless terminal should be kept charged.

To address these needs, a wireless terminal has been deployed in conjunction with a wall-mounted pod that is typically located outside of a hospital room. The wireless terminal connects to the pod for storage, and may be removed from the pod as needed. The pod houses a battery charger that connects to an electric power supply. The pod also includes a solenoid-operated lock that keeps the wireless terminal securely connected to the pod until a user enters a predefined code into the wireless terminal to unlock the pod.

These conventional wall-mounted pods include multi-pin cable connectors for functionally connecting the pod to the wireless terminal. A receptacle mounted on the back of the wireless terminal includes opposing connectors. The pod connectors are located on the top side of the pod, and the receptacle connectors are located on the bottom side of the receptacle. The wireless terminal is connected to the pod by lining-up and then pressing the connectors into engagement. The pod senses this connection and automatically activates the solenoid to lock the terminal to the pod. Thus, when the wireless terminal is connected to the pod, the receptacle sits on top of the pod, with the connectors of the pod engaged with the connectors of the wireless terminal. The wireless terminal is removed from the pod by unlocking the pod and then lifting the wireless terminal to disengage the connectors.

This conventional type of wall-mounted pod has a number of drawbacks. First, attaching the receptacle to the back of the wireless terminal requires an expensive after-factory modification to the wireless terminal. Second, the added-on receptacle makes the wireless terminal more difficult to use because, once removed from the pod, the terminal won't lay flat, face up. Third, the connectors on the receptacle can snag on clothing and break fingernails when the terminal is handled. Fourth, the upward and downward force required to remove and install the wireless terminal exerts torsion forces on the receptacle that tend to tear it loose from its mounting. Fifth, the multi-pin cable connectors often create a tight-fitting linkage that is difficult to separate.

The tight-fitting linkage between the connectors can be aggravating because it makes the wireless terminal difficult to install and remove from the pod. The tight-fitting linkage also makes one-handed installation and removal of the wireless terminal particularly difficult. Some people find the upward force required to work the connectors free straining on the back. Worse yet, the multi-pin connectors can grab and then release suddenly, causing the user's arm to swing wildly, possibly jamming the user's fingers into the pod, striking another person, or throwing the user off balance.

Moreover, the multi-pin connectors suffer from wear and tear and eventually fail. If a connector fails when the wireless terminal is connected to the pod, the terminal may be locked to the pod with no way to open the lock. Failure of the wireless terminal or the solenoid can also cause the terminal to be locked to the pod with no way to open the solenoid-operated lock. Alternatively, if the connector or the solenoid fails when the wireless terminal is not connected to the pod, there may be no way to lock the pod after returning the wireless terminal for storage.

There is, therefore, a need for an improved storage mechanism for a wireless terminal. Specifically, there is a need for a storage mechanism that eliminates the need for an added-on receptacle mounted on the back of the wireless terminal. There is a further need for a storage mechanism that allows the wireless terminal to be installed and removed with one hand without straining the user's back or otherwise releasing the terminal in a manner that could cause injury. There is a further need for a storage mechanism that is operative for locking and unlocking the wireless terminal in the storage mechanism if a component of the locking system fails.

SUMMARY OF THE INVENTION

The invention overcomes these drawbacks by providing a cradle for holding a device, such as a wireless terminal. Generally described, a cradle includes a bracket and a restraining member that is movable from an open position to a closed position. The held device may be removed from the cradle when the restraining member is in the open position, and the held device is resiliently restrained in the cradle when the restraining member is in the closed position. The cradle also includes a lock and a unlocking mechanism. The lock is movable from a release position to an interference position to positively restrain the held device in the cradle. The unlocking mechanism can selectively move the lock from the interference position to the release position to allow the held device to be removed from the cradle.

According to an aspect of the invention, the bracket can include two spaced-apart retainers for receiving a first side of the held device. The restraining member includes a leveling tray for resiliently supporting a second side of the held device opposite the first side. This configuration allows the held device to be easily installed in, and removed from, the cradle with one hand. The cradle may also include a dog for automatically locking the cradle when the held device is installed in the cradle, and for automatically maintaining the lock in the release position when the held device is not in the cradle.

According to another aspect of the invention, the cradle may include a battery charger for charging a battery within the held device when the device is in the cradle. The cradle may also include an interface, such as an optical interface, for transmitting information between the held device and the cradle when the device is in the cradle. The lock of the cradle may include a return spring for urging the lock into the interference position and a key-lock for manually moving the lock against the return spring and into the release position. The cradle may also include an actuator for selectively moving the lock against the return spring into the release position and a trigger for activating the actuator in response to a user command.

There are several alternative types of triggers for unlocking the cradle. A cradle may include any of these triggers separately or in combination. The trigger typically includes a memory for storing one or more predefined passwords, an input device for receiving an entry code, and a processor, coupled to the memory and the input device, for activating the actuator in response to the received entry code matching a predefined password. The input device may include a keypad located on the cradle, a keyboard supported by and functionally connected to the cradle, a touch-sensitive receptor located on the held device, or a program module resident on the held device that may be operated via a remote computer terminal by way of wireless communication with the held device.

According to another aspect of the invention, the cradle includes an indicator, such as a status light on the cradle, for providing a user with feedback while the user enters a password into the cradle. A first status indicator, such as the status light blinking three times slowly, may indicate that a password has been rejected. A second status indicator, such as the status light remaining steadily on for about two seconds, may indicate that a password has been accepted. A third status indicator, such as the status light blinking quickly, may indicate that the cradle has received a partial password.

For yet another aspect of the invention, the cradle can include a support arm coupled to the bracket for a holding an input device, such as a keyboard. A communication link can functionally connect the keyboard and the held device when the device is in the cradle. The cradle also can include a hinge between the support arm and the bracket for articulating the support arm relative to the bracket between a lowered position and a raised position, a brake for selectively maintaining the support arm in the raised position, and a release for returning the support arm to the lowered position.

More specifically described, the cradle may include a lower spring-loaded leveling tray and an upper bracket including two spaced-apart retainers that allow one-handed access to the held device. The leveling tray may be moved downward against the spring force into a retracted position that allows the held device to be easily installed and removed from the cradle using an ergonomically safe pushdown-and-tilt motion. The bracket and the leveling tray may be adjusted to fit held devices of differing sizes, and the keypad and keyboard are optional so that the cradle may be deployed in several different configurations.

Easy removal is enhanced, and connector wear and tear is avoided, by using an optical communication link between the cradle and the held device, such as an optical communication link using the standard protocol adopted by the Infrared Data Association (IRDA). The optical communication link allows an optional articulating keyboard to communicate with the held device when the device is in the cradle. An optical interface is manufactured into the held device so that after-factory modifications to the held device are not required. A battery charging unit in the cradle charges the battery in the held device when the device is stored in the cradle.

The leveling tray is automatically locked when the held device is installed in the cradle. When the held device is in the cradle, a solenoid may be activated to open the lock. The cradle can include up to three ways to activate the solenoid to open the security lock: a password entered into the keyboard, a password entered into a four-button keypad on the cradle, and an application program that may be operated from the held device or from another terminal in the patient-care computer network. Alternatively, a manual key-lock may operate the lock if another component of the locking system fails. The cradle also includes a dog that automatically locks the cradle when the held device is installed in the cradle, and that automatically keeps the cradle unlocked when the held device is removed from the cradle.

Although the number of passwords may be easily increased or decreased, the cradle may preferably be programmed with up to fifty passwords. Passwords may be entered from the keypad, the keyboard, the wireless terminal, a held device, or from another terminal in the patient-care computer network. The cradle includes an electrically erasable programmable read only memory (EEPROM) for storing the passwords and a control program for the cradle.

The cradle may also include up to three light sources: a power light, a charging light, and a status light. These lights provide a user with visual feedback to indicate the state of the cradle. The status light has four states: on, off, blinking slowly, and blinking quickly. These states provide a user with feedback regarding the programming of passwords into the cradle.

In summary, the invention provides an improved storage mechanism for a device, such as a wireless terminal. The cradle eliminates the need for an added-on receptacle mounted on the back of the held device. The cradle allows the held device to be installed and removed with one hand using an ergonomically safe push-down-and-tilt motion. The cradle is also operative for locking the held device in the cradle, and for manually locking and unlocking the cradle if a component of the locking system fails. The cradle also can include an articulating support arm for a keyboard. That the invention improves over the drawbacks of the prior art and accomplishes these advantages will become apparent from the following detailed description of the exemplary embodiments and the appended drawings and claims.

BRIEF DESCRIPTION OF THE DRAWINGS

FIG. 1 is a perspective view of a cradle for holding a wireless terminal and keyboard in accordance with an exemplary embodiment of the present invention.

FIG. 2 is a perspective view of the cradle of FIG. 1 with a wireless terminal and a keyboard installed.

FIG. 3A is a perspective view of the cradle of FIG. 1 with a wireless terminal pushed down so that the leveling tray is in the retracted position.

FIG. 3B is a perspective view of the cradle of FIG. 1 with a wireless terminal pushed down and tilted forward for removal.

FIG. 4 is an exploded perspective view of a lock mechanism of the cradle shown in FIG. 1.

FIG. 5A is a front view of the lock mechanism of FIG. 4 shown in the locked position.

FIG. 5B is a side view of a bracket retainer in a locked position for the cradle shown in FIG. 1.

FIG. 5C is a front view of the lock mechanism of FIG. 4 shown in the unlocked position.

FIG. 5D is a side view of a bracket retainer in a locked position for the cradle shown in FIG. 1.

FIG. 6A is a rear view of a keyboard support arm of the cradle shown in FIG. 1.

FIG. 6B is a side view of a keyboard support arm placed in a lowered position, for the cradle shown in FIG. 1.

FIG. 6C is a side view of a keyboard support arm placed in a raised position for the cradle shown in FIG. 1.

FIG. 7 is a diagram that illustrates the placement of electrical components within the cradle shown in FIG. 1.

DETAILED DESCRIPTION

Figure 8:
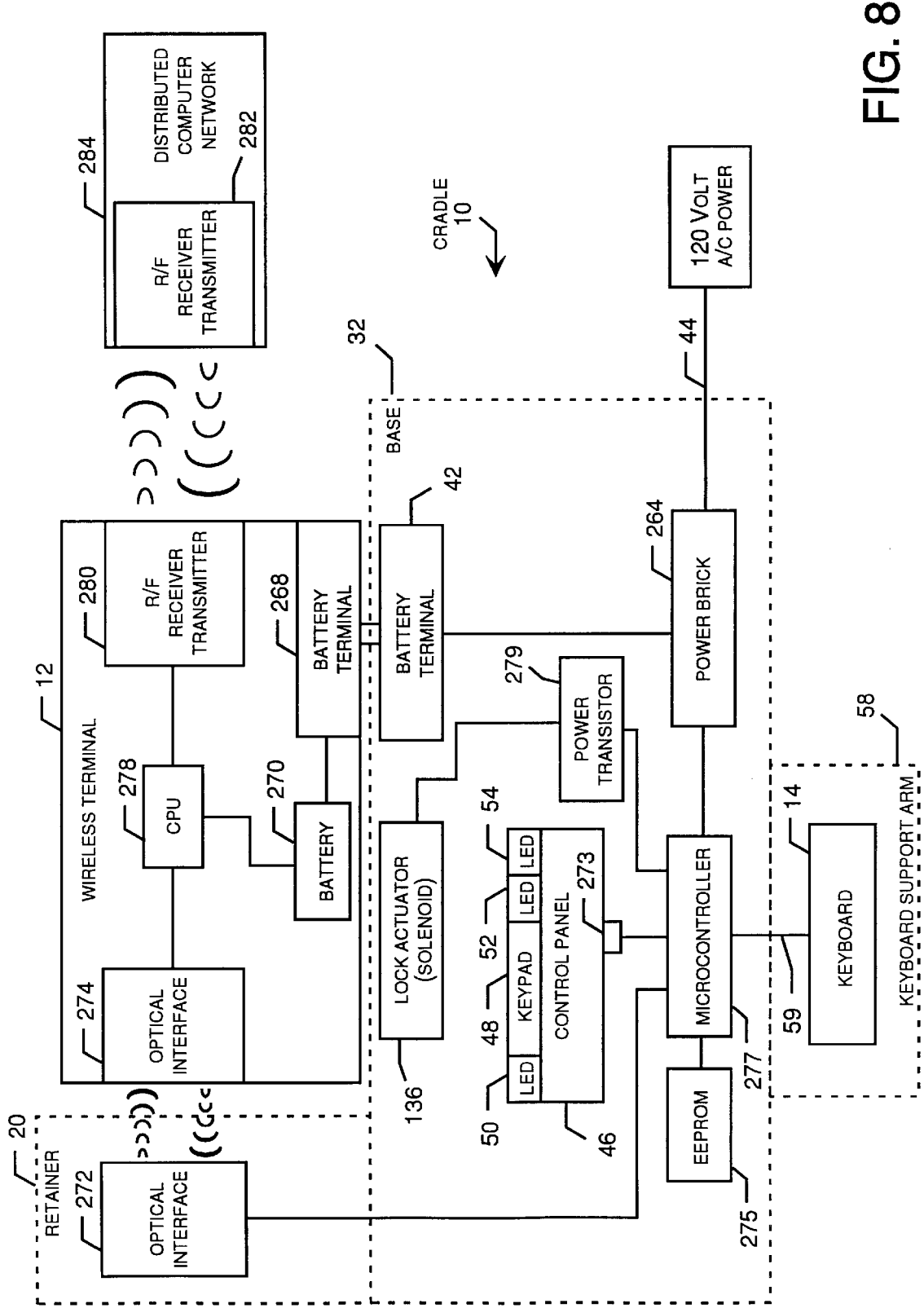
FIG. 8 is a functional block diagram of the cradle shown in FIG. 1.

The exemplary embodiment of the present invention is a cradle for holding a device. The cradle may be used to hold a wide variety of devices, but is particularly well suited to holding a wireless terminal. The cradle may include a battery charging unit and an optical interface that eliminates multi-pin cable connectors between the cradle and the wireless terminal. A touch-pin connection terminal for the battery charging unit and the optical interface avoid the need for an added-on receptacle, mounted on the back of the wireless terminal, for charging and communicating with the terminal. The cradle includes a bracket-and-leveling-tray restraining system that allows the wireless terminal to be installed and removed with one hand using an ergonomically safe push-down-and-tilt motion. The cradle further includes up to four mechanisms for unlocking the leveling tray, including a manual key lock that may operate the lock mechanism if another component of the locking system fails. The cradle also can include an articulating support arm for an optional keyboard.

Referring to the drawings, in which like numerals indicate like elements throughout the several figures, FIG. 1 is a perspective view of a cradle 10 for holding a device with an associated input device, such as the wireless terminal 12 and the keyboard 14 (both shown in phantom by dashed lines). The wireless terminal 12 preferably includes a radio transmitter/receiver for communicating with a distributed computer network. The wireless terminal 12 also includes an interface, such as an optical interface, for communicating with the cradle 10. Thus, the cradle 10 may be operated or configured from any terminal in the distributed computer network when the wireless terminal 12 is in the cradle 10.

The wireless terminal 12 is supported in the cradle 10 by a bracket 16 that includes a back plate 18 and two retainers 20 and 22. These retainers define a cavity 26 for receiving and positively restraining the top side 26 of the wireless terminal 12. The back plate 18 includes four holes (not shown) that receive fasteners for hanging the cradle 10 on a vertical surface, such as a wall.

The retainers 20 and 22 are spaced apart a sufficient distance to form an opening 28 that is wide enough to allow a user to grasp the top side 26 of the wireless terminal 12 with one hand. The back plate 18 includes two spacers 30a and 30b that space the wireless terminal 12 from back plate 18. The width back plate 18 plus the spacers 30a and 30b is sufficient to allow a user's fingers to fit between the top side 26 of the wireless terminal 12 and the wall. The spacers 30a and 30b provide additional finger room and also prevent rubber tabs that are often included on the back of a wireless terminal from dragging against the back plate 18. For example, most people can easily grasp the wireless terminal 12 with one hand if the opening 28 between the retainers 20 and 22 is about six inches and the width back plate 18 plus the spacers 30a and 30b is about one-half inch.

The bottom of the back plate 18 is connected to a base 32 that includes a spring-loaded leveling tray 34 that defines a cavity 36 for receiving the bottom side 38 of the wireless terminal 12. The leveling tray 34 may be locked to positively restrain the wireless terminal 12 in the cradle 10. Alternatively, the leveling tray 34 may be unlocked to resiliently restrain the wireless terminal 12 in the cradle 10. The operation of the leveling tray is described in more detail below with reference FIGS. 2 and 3A–3B. The structure and operation of the locking mechanism is described in more detail below with reference FIGS. 4 and 5A–5D.

The cavity 36 includes a foam-rubber bushing 40 that fits snugly against the bottom side 38 of the wireless terminal 12. A tough-pin battery charging terminal 42, which extends through the bushing 40, electrically connects with contacts on the bottom side 38 of the wireless terminal 12 to charge a battery that is located inside the wireless terminal 12. A power cord 44 supplies electric power to the battery charger and the other electrical components that are housed within the base 32 of the cradle 10. The electrical components of the cradle 10 are described in more detail below with reference to FIGS. 7–10.

The top of base 32 includes a control panel 46 with a four-button keypad 48 and three status lights. The keypad 48 may be used to unlock the leveling tray 34. The keyboard 14 and wireless terminal 12 may also be used to unlock the leveling tray 34. The base 32 includes a key lock 56 that may be the only mechanism for locking and unlocking the leveling tray 34. Alternatively, the key lock 56 may be deployed in conjunction with one or more electronic locking and unlocking mechanisms. In this case, the key lock 56 may serve primarily as a back-up locking and unlocking mechanism should the other locking and unlocking mechanisms fail.

The status lights include a power indicator light 50, a charging indicator light 52, and a status light 54. The power indicator light 50 is lit when the power cord 44 supplies electric power to the cradle 10. The charging indicator light 52 blinks when the battery in the wireless terminal 12 is charging. The speed of the blinking of the charging indicator light 52 indicates the amount of charging taking place. That is, the charging indicator light 52 blinks very slowly when the wireless terminal is fully charged, and it blinks more quickly when a higher level of charging is taking place. The operation of the status light 54 is described below with reference to FIG. 2.

The bottom of the base 32 is connected to a support arm 58 for holding the keyboard 14. A standard keyboard cable 59 functionally connects the keyboard 14 to the base 32, which is functionally connected to the wireless terminal 12. A pair of hinges 60a and 60b allow a user to articulate the keyboard 14 between a raised position and a lowered position. The support arm 58 includes a brake 62 for maintaining the support arm 58 in the raised position. To lower the support arm 58, a user releases the brake 62 by squeezing the release handle 64. The structure and operation of the support arm 58 is described in more detail below with reference to FIGS. 6A–6C.

Although all of the disclosed embodiments preferably include the key lock 56, the cradle 10 may be deployed with or without keypad 48 or the keyboard 14. Thus, four versions of the cradle 10 are contemplated: (1) without keypad and without keyboard, (2) with keypad and without keyboard, (3) without keypad and with keyboard, and (4) with keypad and with keyboard. This allows users to select an alternative embodiment that best suits their cost and performance needs. The cradle 10 may also be easily adjusted to fit wireless terminals of different sizes by providing an adjustable-height back plate 18, or by changing the size of the back plate 18, and changing the bushing 40. In addition, a dog for the lock mechanism must be sized to fit the height of the wireless terminal (see FIG. 4).

Those skilled in the art will appreciate that the leveling tray 34 is but one of many alternative types of resilient restraining members that may be used in conjunction with a locking mechanism to selectively lock the wireless terminal 12 in the cradle 10. That is, the leveling tray 34 may equivalently be replaced by any type of restraining member that resiliently restrains the wireless terminal 12 in the cradle 10. The disclosed locking mechanism may equivalently be replaced by any type of locking mechanism that may be selectively operated to positively restrain the wireless terminal 12 in the cradle 10. For example, snap fittings may resiliently restrain the wireless terminal 12 in the cradle 10, and retracting tabs or pins may be selectively operated to positively restrain the wireless terminal 12 in the cradle 10. Many other types of restraining members and locking mechanisms may also be used, such as those including various types of plungers, sockets, cams, ratchets, pawls, magnets, teeth, brackets, adhesives, hook-and-loop fasteners, push-and-turn fasteners, zippers, hasps, bolts, hinges, latches, etc.

Turning now to the operation of the cradle 10, FIG. 2 shows the cradle 10 with the wireless terminal 12 and the keyboard 14 installed. The cradle 10 includes an electrically erasable programmable read only memory (EEPROM) that may be programmed with fifty or more passwords (see FIGS. 9–10). The cradle 10 is programmed with passwords by placing the cradle in a configuration state and then entering passwords. A user places the cradle 10 in the configuration state by entering touch-screen commands into the wireless terminal 12, or by using the keyboard 14, the keypad 48, or by using a remote terminal in the distributed computer network. Thus, the cradle 10 may only be programmed with passwords while the wireless terminal 12 is in the cradle 10.

Once the cradle 10 is in the configuration state, a user may enter passwords using a data entry device, such as the keypad 48 or the keyboard 14, or if the user is remotely accessing the cradle 10, by using a data entry device that is operable with the remote terminal. A touch-screen keypad displayed on the wireless terminal 12 may also be used to enter passwords.

If the user is configuring the cradle from the keypad 48 or the keyboard 14, the status light 54 begins blinking to provide the user with feedback when the cradle 10 enters the configuration mode. In the configuration mode, the status light 54 provides a user with feedback while the user enters new passwords using the keypad 48 or the keyboard 14. When a user starts to enter the password, the status light 54 begins blinking in quickly (e.g., 0.4 seconds on, 0.1 seconds off). The status light 54 continues to blink quickly so long as a user has started, but has not completed, entering a password. The status light 54 remains lit for about two seconds and then turns off to indicate that a password has been accepted. Alternatively, the status light 54 blinks three times slowly (e.g., 0.8 seconds on, 0.1 seconds off) and then turns off to indicate that a password has been rejected. In addition, the status light 54 is turned off after a time-out period if a user starts but does not finish entering a password.

It should also be understood that if the user is configuring the cradle from the wireless terminal 12 or from a remote terminal, these devices may provide the user with feedback during the configuration process, and the status light 54 need not blink to provide the user with feedback.

There are up to four ways to unlock the leveling tray 34: by entering a predefined password using the keypad 48, by entering a predefined password using the keyboard 14, by operating an application program running on the wireless terminal 12, and by using the key lock 56. Many other types of unlocking mechanisms may also be used, such as a card-swipe reader, a palm-print reader, a magnetic proximity sensor, a voice-recognition unit, etc. The status light 54 provides a user with feedback while the user enters a password using the keypad 48 or the keyboard 14 to unlock the cradle 10. When a user starts to enter the password, the status light 54 begins blinking quickly (e.g., 0.4 seconds on, 0.1 seconds off). The status light 54 continues to blink quickly so long as a user has started, but has not completed, entering a password. Upon entry of a valid password, the cradle 10 is unlocked and the status light 54 remains lit for about two seconds and then turns off. Alternatively, the cradle 10 remains locked and the status light 54 blinks three times slowly (e.g., 0.8 seconds on, 0.1 seconds off) and then turns off to indicate that a password has been rejected. In addition, the status light 54 is turned off after a time-out period if a user starts but does not finish entering a password.

To remove the wireless terminal 12 from the cradle 10, a user unlocks the leveling tray 34 and grasps the top side 26 of the wireless terminal 12. The user then pushes down on the wireless terminal 12 to move the leveling tray 34 from the extended position, as shown in FIG. 2, and against the spring force to the retracted position, as shown in FIG. 3A. The user then tilts the wireless terminal 12 forward, as shown in FIG. 3B. The wireless terminal 12 is installed in the cradle 10 using a reverse push-down-and-tilt-in motion. A user can therefore use these ergonomically safe motions to remove the wireless terminal 12 from, and install the wireless terminal 12 in, the cradle 10.

The lock mechanism 100 of the cradle 10 will now be described with reference to FIGS. 4 and 5A–5D. FIG. 4 is an exploded perspective view of the lock mechanism 100 of the cradle 10. FIG. 5A is a front view of the lock mechanism 100 in the locked position, and FIG. 5B is a side view of the bracket retainer 22 in the locked position. FIG. 5C is a front view of the lock mechanism 100 in the unlocked position, and FIG. 5D is a side view of the bracket retainer 22 in the unlocked position.

The bottom of the leveling tray 34 opposes a shelf 102 that is rigidly attached to the base 32. The shelf 102 includes two depressions 104a and 104b for receiving the bottom ends of two springs 106a and 106b. Spring sleeves 108a and 108b that project downward from the bottom of the leveling tray 34 receive the upper portions of the springs 106a and 106b. The upper ends of the springs 106a and 106b bear against the bottom of the leveling tray 34. The springs 106a and 106b are partially compressed, or sufficiently rigid when uncompressed, to support the weight of the wireless terminal 12 when the leveling tray 34 is in the extended position. The springs 106a and 106b are further compressed when the leveling tray 34 moves to the retracted position and against the force of the springs 106a and 106b.

In addition, the shelf 102 includes a guide hole 110 that opens into a guide sleeve 112 for slidably receiving a guide rod 114 that projects downward from the bottom of the leveling tray 34. The guide rod 114 slides within the guide sleeve 112 when the leveling tray 34 moves between the extended position to the retracted position. The sliding interaction between the guide rod 114 and the guide sleeve 112 stabilizes the leveling tray 34 to prevent it from tilting relative to shelf 102 when uneven downward pressure is applied to the leveling tray 34.

The leveling tray 34 is further stabilized by a leveling arm 118 that extends between the leveling tray 34 to the shelf 102. The leveling arm 118 includes a longitudinal portion 120 that is clipped to the bottom of the leveling tray 34. Two "L" shaped fingers 122a and 122b extend downward and then inward from the ends of the longitudinal portion 120 of the leveling arm 118. The shelf 102 includes a pair of channels 124a and 124b for slidably receiving the bottom portions of the fingers 122a and 122b. The leveling arm 118 rotates with respect to the shelf 102 when the leveling tray 34 moves between the extended position to the retracted position so that the fingers 122a and 122b slide within the channels 124a and 124b. The interaction between leveling arm 118 and the channels 124a and 124b prevents the leveling tray 34 from tilting and binding against the base 32 or the shelf 102.

Two plungers 126a and 126b that project downward from the bottom of the leveling tray 34 oppose a lock tray 128 that is slidably supported within a pin array 130 that extends upward from the shelf 102. A return spring 132 urges the lock tray 128 into an interference position in which two blocks 134a and 134b line up with the plungers 126a and 126b to lock the leveling tray 34. This prevents the leveling tray 34 from moving from the extended position to the retracted position. A solenoid 136, which sits in a recess 138 of the shelf 102, is operative to slide the lock tray 128 within the pin array 130 against the force of the return spring 132, as shown best in the transition between FIGS. 5A and 5C. When energized, the solenoid 136 unlocks the leveling tray 34 by sliding the lock tray 128 from the interference position to the release position. This clears the plungers 126a and 126b from the blocks 134a and 134b, so that the leveling tray 34 may be moved from the extended position to the retracted position.

The lock tray 128 also includes a front panel 140 that defines a notch 142 for receiving a latch 144 that is connected to the key lock 56. The latch 144 is connected to a flange 146 that extends vertically when the key lock 56 is in the locked position. Rotating the key lock 56 90 degrees clockwise from the locked position to the unlocked position rotates the flange 146 90 degrees clockwise, which causes the latch 144 to move laterally toward the solenoid 136 and downward. The lateral movement of the latch 144 moves the lock tray 128 from the interference position to the release position. It will be appreciated that the notch 142 must be deep enough to accommodate the downward movement of the latch 144. The flange 146, when in the locked position, is positioned within a mechanical stop that is connected to the cover of the base 32 so that the cover cannot be removed from the base 32 while the flange 146 is in the locked position.

In the embodiment illustrated in FIG. 4, the lateral movement of the latch 144 is greater than the lateral movement of the lock tray 128. Thus, the notch 142 only accommodates a portion of the downward movement of the latch 144. This configuration allows a full 90 degree rotation of the conventionally-sized key lock 56 while minimizing the stroke required of the solenoid 136 and the height of the lock tray 128.

In addition, the lock tray 128 includes a rear panel 147 that defines a dog notch 148 for receiving a dog 150 that latches the lock tray 128 in the release position when the wireless terminal 12 is not in the cradle 10. The dog 150 extends from the lock tray 128 through the back plate 18 and through the retainer 22, as shown best in FIG. 4. A release bar 152 defined by the dog 150 hangs slightly into the cavity 24. When the wireless terminal 12 is in the cradle 10, the top side 26 of the wireless terminal 12 engages the release bar 152 to lift the dog 150 out of the dog notch 148, as shown in FIG. 5B. The leveling tray 128 is thus released so that the return spring 132 urges the unlatched lock tray 128 into the interference position to automatically lock the leveling tray 34 when the wireless terminal 12 is installed in the cradle 10. Conversely, when the lock tray 128 is in the release position and the wireless terminal 12 is removed from the cradle 10, the dog 150 falls into the dog notch 148 to automatically latch the lock tray 128 in the release position, as shown in FIG. 5D. It should be appreciated that the dog 150 must be sized to fit the height of the wireless terminal 12.

Turning now to the support arm 58 for the keyboard 14, FIG. 6A is a rear view of the keyboard support arm 58, FIG. 6B is a side view of the keyboard support arm 58 in the lowered position, and FIG. 6C is a side view of the keyboard support arm 58 in the raised position. The bottom portion of the support arm 58 defines a handle 186. A hinge bracket 188 forms the hinges 60a and 60b that connect the upper portion of the support arm 58 to the base 32. Rivets 192a and 192b, or similar fasteners, rotatably connect the support arm 58 to the hinge bracket 188.

The support arm 58 includes a brake 62 for maintaining the support arm 58 in the raised position. The brake 62 defines a handle 64 that is positioned within the handle 186 of the support arm 58. The brake 62 also includes two longitudinal sections 192a and 192b that extend from the handle 64 toward the base 32, two flaring sections 194a and 194b that extend diagonally toward the base 32 and toward the hinges 60a and 60b, and two lateral sections 196a and 196b that extend parallel to the bottom of the base 32 and toward the hinges 60a and 60b. Two bends 198a and 198b are formed at the intersections between the lateral sections 196a and 196b and the flaring sections 194a and 194b. The support arm 58 includes two pegs 200a and 200b that are located adjacent and within the bends 198a and 198b.

The brake 62 is configured so that the lateral sections 196a and 196b of the brake 62 may protrude through two oblong holes 202a and 202b in the hinges 60a and 60b, and through two oblong holes 204a and 204b in the support arm 58. The brake 62 maintains the support arm in the raised position when the lateral sections 196a and 196b of the brake 62 protrude through the oblong holes 202a–b and 204a–b, as shown in FIG. 6C. To move the support arm 58 to the lowered position, as shown in FIG. 6B, a user releases the brake 62 by squeezing the handle 64 to move the brake 62 toward the bottom of the support arm 58. This causes the flaring sections 194a and 194b of the brake 62 to ride against the pegs 200a and 200b, which retracts the lateral section 196a and 196b from the oblong holes 202a–b and 204a–b, so that the support arm 58 may rotate about the rivets 192a and 192b.

FIG. 7 is a diagram that illustrates the placement of electrical components of an exemplary embodiment of the cradle 10. FIG. 8 is a functional block diagram that illustrates the electrical components shown in FIG. 7. The cradle 10 includes a power supply system 260 and a communication and control system 262. Turning first to the power supply system 260, the base 32 houses a power brick 264, which is typically provided as standard equipment for the wireless terminal 12. The power brick connects to a conventional 120 Volt AC power supply by way of the power cord 44. The power brick 264 coverts this 120 Volt AC power supply into a 16 Volts DC power source that is provided to the touch-pin battery charging terminal 42, which mates with a receptacle 268 in the wireless terminal 12. The receptacle 268, in turn, is connected to a battery 270 in the wireless terminal 12. The power brick 264 thus serves as a battery charger for the battery 270 when the wireless terminal 12 is stored in the cradle 10.

The 16 Volts DC power source is also provided to the circuit board 266, which is located within the base 32. The power brick 264 thus provides power supply, conditioning, and surge protection for the communication and control system 262. The circuit board 266 locally regulates the 16 Volts DC power supply to provide the required voltages for the electronic components connected to the circuit board 266, which include a microcontroller 277, such as an 8051 microcontroller manufactured by Intel Corp., an EEPROM 275, and a power transistor 279. The circuit board 266 is connected to the control panel 46 by way of the connector 273.

The EEPROM 275 stores the passwords and the microcontroller 277 controls the operation of the control panel 46, as described below with reference to FIGS. 8 and 9. The circuit board 266 is also connected to the solenoid 136 so that the microcontroller 277 can fire the power transistor 279, which in turn fires the solenoid 136, to unlock the leveling tray 34 in response to a correct password. In addition, the circuit board 266 is connected to an optical interface, such as the optical interface 272, which is opposed by an optical interface 274 in the wireless terminal 12. The optical communication link 272, 274 provides the equivalent of a serial port communication link between the wireless terminal 12 and the cradle 10.

The optical interface 274 in the wireless terminal 12 is connected to the central processing unit (CPU) 278 of the wireless terminal 12, which is connected to a radio transmitter/receiver 280 that communicates with the transmitters/receivers 282 of a distributed computer network 284 to functionally connect the wireless terminal 12 to the distributed computer network 284. Thus, the wireless terminal 12 and the other terminals of the distributed computer network 284 can communicate with the cradle 10 when the wireless terminal 12 is in the cradle 10. The keyboard 14 is also connected to the circuit board 266 so that the keyboard 14 can communicate with the cradle 10. When the wireless terminal 12 is in the cradle 10, the keyboard 14 can communicate with the wireless terminal 12. The optical communication link 272, 274 advantageously avoids the problems associated with including multi-pin cable connectors between the wireless terminal 12 and the cradle 10, and between the wireless terminal 12 and the keyboard 14.

In addition to the key lock 56, the cradle 10 may include several alternative types of triggers for unlocking the cradle 10. The trigger typically includes a memory, such as the EEPROM 275, for storing one or more predefined passwords and a data entry device, such as the keypad 48, for receiving an entry code. The trigger also includes a processor, such as the microcontroller 277 and the power transistor 279, coupled to the memory and the data entry device, for activating an actuator, such as the solenoid 136, to unlock the cradle 10 in response to the received entry code matching a predefined password.

The data entry device may include the keypad 48, the keyboard 14, a touch-sensitive receptor located on the wireless terminal 12, or a program module resident on the wireless terminal 12 that may be operated via the remote computer terminal 284 by way of wireless communication with the wireless terminal 12. These different types of data entry devices may be deployed separately or in combination to allow users to select an alternative embodiment that best suits their cost and performance needs. The keypad 48 is an important feature because it provides an inexpensive data entry device that allows the cradle 10 to be self-contained. That is, the keypad 48 may be used to operate the cradle in an environment in which the wireless terminal 14, the remote terminal 284, and the keyboard 14 are not provided or, if provided, are not operational as data entry devices for cradle 10. This allows a user to easily adapt the cradle 10 for use in a wide variety of applications.

To enhance the versatility of the cradle 10, the keypad 48 may be used to configure the cradle 10 with passwords and to unlock the cradle 10 by entering a predefined password. Advantageously, the status light 54 provides a user with feedback while the user operates the keypad 48 to configure and unlock the cradle 10. The status light 54 may also provide feedback while the user operates another data entry device, such as the keyboard 14 or a touch-sensitive receptor located on the wireless terminal 12. In addition, the screen of the wireless terminal 12 or another device, such as an annunciator, may provide a user with feedback while the user enters passwords into the cradle 10. But the cradle 10 is fully operational even if the keypad 48 is the only data entry device, and the status light 54 is the only feedback device, provided.

Figure 9:
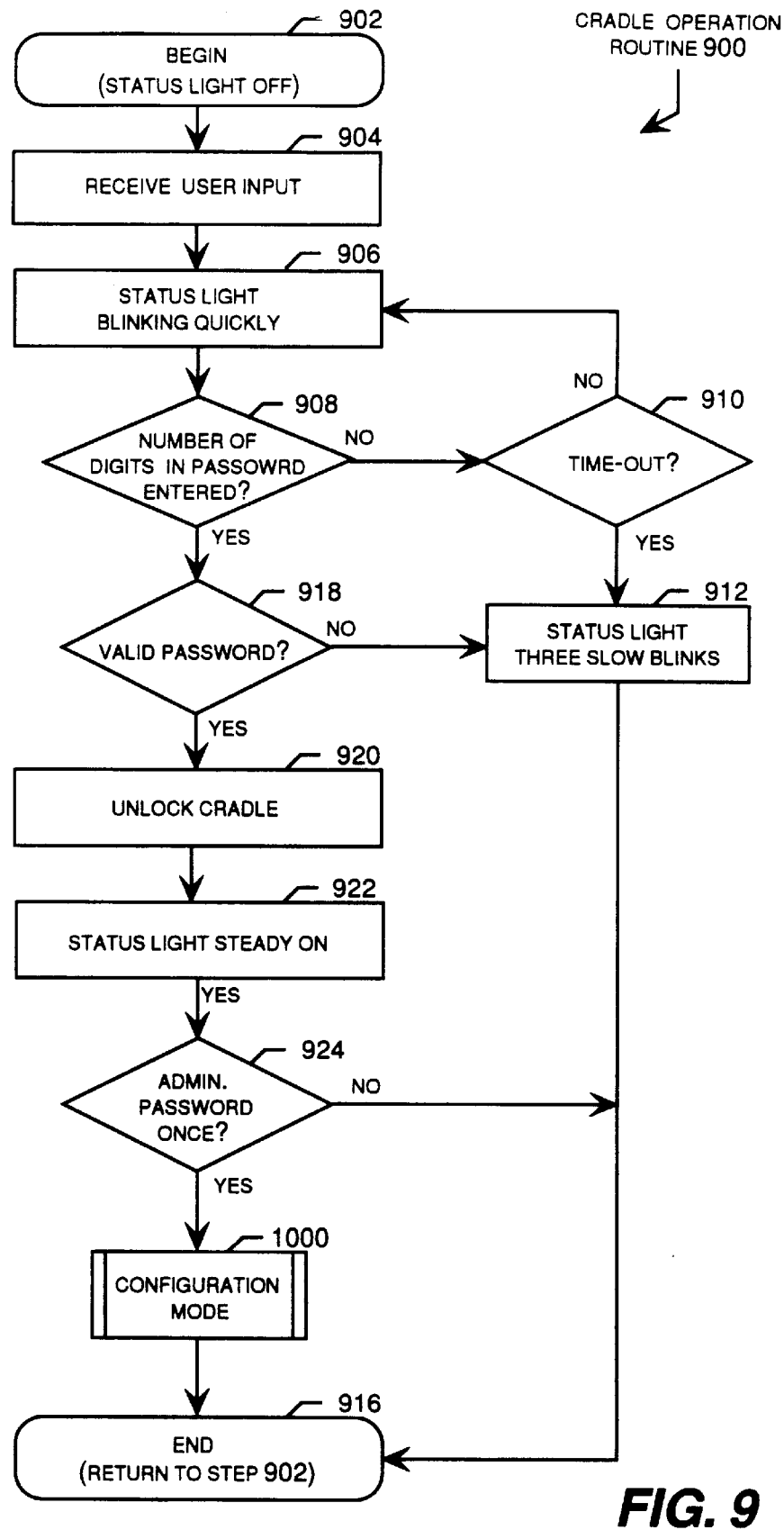
FIG. 9 is a logic flow diagram illustrating the operation of the cradle shown in FIG. 1.

FIG. 9 is a logic flow diagram illustrating routine 900, the operation mode of the cradle 10. Generally, a user enters one of fifty or more predefined passwords to unlock the cradle 10. The number of digits defining a valid password may be easily set within one to eight digits. Once a valid password has been entered, the microcontroller 277 fires the power transistor 279, which in turn fires the solenoid 136, to unlock the cradle 10.

The status light 54 provides the user with feedback while the user attempts to unlock the cradle 10. Generally, the status light 54 blinks quickly, blinks slowly, or stays lit for a few seconds to provide the user with feedback. Once a user begins to enter a password, the status light 54 blinks quickly (e.g., 0.4 seconds on, 0.1 seconds off) to indicate that a password has been partially entered. Once a valid password has been entered, the status light 54 stays on for a few seconds to indicate that the cradle is unlocked. Alternatively, if the password is invalid, the status light 54 blinks three times slowly (e.g., 0.8 seconds on, 0.1 seconds off) to indicate that the password has been rejected. The status light 54 then remains off and the cradle remains locked.

Figure 10:
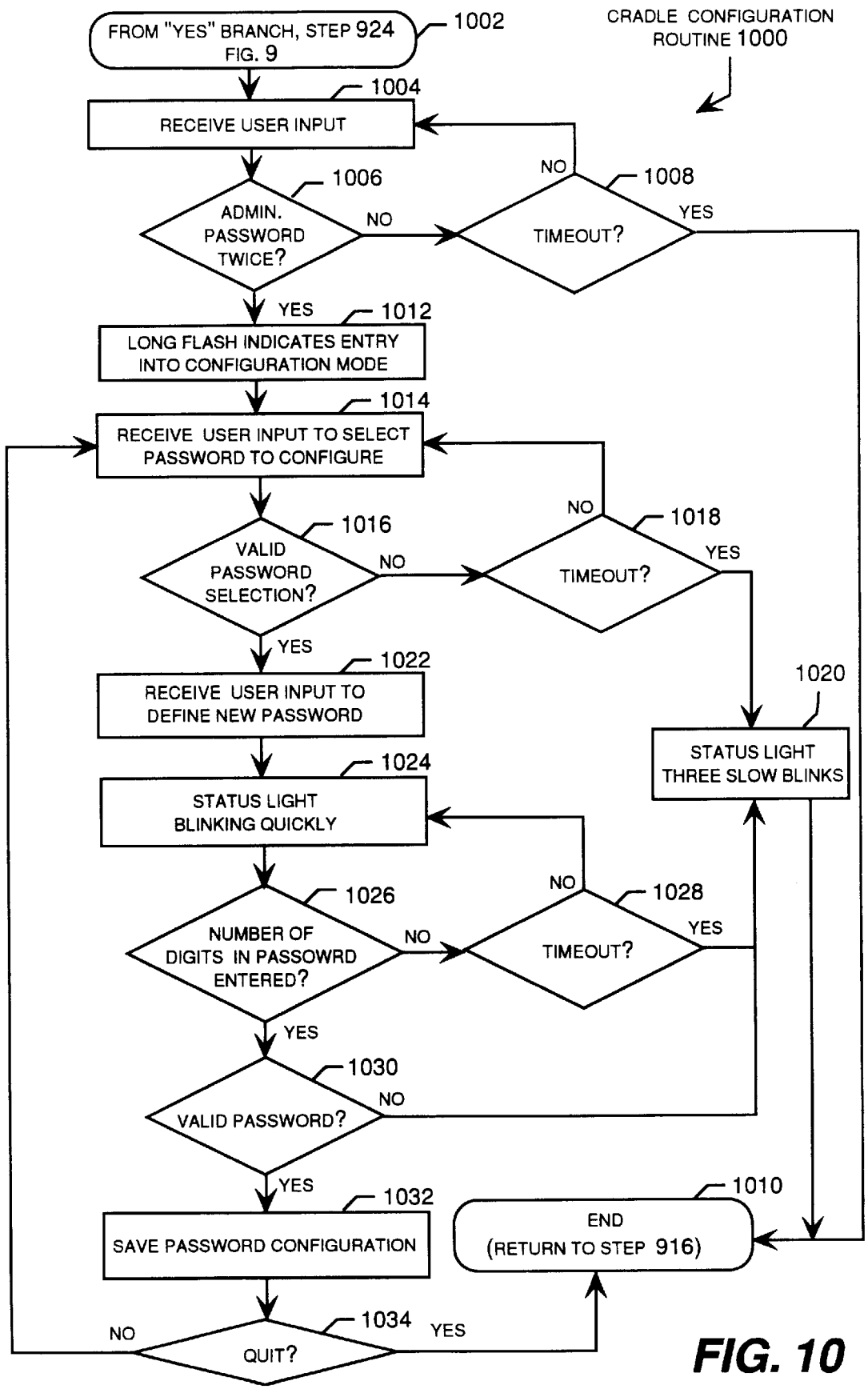
FIG. 10 is a logic flow diagram illustrating the configuration of passwords in the cradle shown in FIG. 1.

If an entered password is a unique administration password, the user may enter the administration password a second time to place the cradle 10 in the configuration mode. Once the cradle 10 is in the configuration mode, the passwords and other operational parameters of the cradle 10 may be changed. The configuration mode is described in detail below with reference to FIG. 10. It will be appreciated that the operation of the status light 54 described with respect to FIGS. 9 and 10 is only an illustrative example, and that many other types of blinking patterns or other indicators may be employed in cradles according to the present invention.

Routine 900 begins at step 902 with the wireless terminal 14 locked in the cradle 10 and the status light 54 off. In step 904, the cradle 10 receives user input, such as a keystroke of the keypad 48. In step 906, the status light 54 begins blinking quickly to indicate that a password has been partially entered into the cradle 10. In step 908, the cradle 10 determines whether the number of digits defining a valid password has been entered. If the number of digits defining a valid password has not been entered, the "NO" branch is followed to step 910, in which the cradle 10 determines whether a time-out period, typically about five seconds, has expired since the last digit was received. If the time-out period has not expired, the "NO" branch loops back to step 906, and the status light 54 continues to blink quickly until the user enters the number of digits defining a valid password or until the time-out period expires. If the time-out period has expired, the "YES" branch is followed to step 912, in which the status light 54 blinks three times slowly. Following step 912, the status light 54 remains off. Step 912 is followed by the "END" step 916, which returns to step 902.

Referring again to step 908, if the number of digits defining a valid password has been received, the "YES" branch is followed to step 918, in which the cradle 10 determines whether the password is valid. If the password is not valid, the "NO" branch is followed to step 912, in which the status light 54 blinks three times slowly to indicate that the password has been rejected. Following step 912, the status light 54 remains off. Step 912 is followed by the "END" step 916, which returns to step 902.

Referring again to step 918, if the password is valid, the "YES" branch is followed from step 918 to step 920, in which the cradle 10 is unlocked. Step 920 is followed by step 922, in which the status light 54 stays on for a few seconds to indicate that the password has been accepted. In step 924, the cradle 10 determines whether the password is the administration password. If the entered password is administration password, the "YES" branch is followed to routine 1000, which is described below with reference to FIG. 10. If the received password is not the administration password, the "NO" branch is followed to the END step 916, which returns to step 902.

FIG. 10 is a logic flow diagram illustrating routine 1000, the configuration mode of the cradle 10. Routine 1000 begins at step 1002, which follows the "YES" branch from step 924 of FIG. 9. In step 1004, the cradle 10 may receive user input and in step 1006, the cradle 10 determines whether the administration password has been received a second time. If the administration password has not been received a second time, the "NO" is followed to step 1008, in which the cradle determines whether a time-out period, typically about five seconds, has expired. If the time-out period has expired, the "YES" branch is followed to the "END" step 1010, which returns to step 916 shown on FIG. 9. If the time-out period has not expired, the "NO" branch loops back to step 1004, in which the cradle 10 may receive additional user input. It should be understood that upon receipt of an invalid password having the same number of digits in the administration password, routine 1000 may go to the "END" step 1010. Alternatively, the cradle 10 may provide an indication of an incorrect entry, such as three slow blinks of the status light 54, and allow the user to retry a predefined number of times. And after the maximum number of allowed entries, routine 1000 may go to the "END" step 1010.

Referring again to step 1006, if the received password is the second occurrence of the administration password, the "YES" branch is followed to step 1012, in which the status light 54 provides a long flash to indicate that the cradle 10 has entered the configuration mode. When the cradle is in the configuration mode, there are a number of parameters that the user may configure, such as the predefined passwords, the administration password, the number of digits in passwords, the duration of the time-out period, and the duration of the fast and slow blinks of the status light 54. Routine 1000 only illustrates the steps for entering or changing passwords. Therefore, the cradle 10 first determines whether the user has selected the option for configuring passwords. If the user has not selected the option for configuring passwords, the cradle 10 responds to the selected configuration command, which may involve the use of the status light 54 to provide the user with feedback while the user interacts with the cradle 10.

If the user has selected the option for configuring passwords, routine 1000 continues with step 1014, in which the cradle 10 receives user input to select a password. Typically, the cradle 10 may be configured to accept up to fifty passwords indexed from 0 to 49 and a user selects a password by entering an appropriate password index. In step 1016, the cradle 10 determines whether the user has selected a valid password. Typically, out-of-range passwords are considered to be invalid. For example, if the cradle is configured to accept passwords indexed from 0 to 49 and the user indicates password index 51, then this would be an invalid password selection.

If the user has not entered a valid password selection, the "NO" branch is followed from step 1016 to step 1018, in which the cradle 10 determines whether a time-out period has expired. If the time-out period has expired, the "YES" branch is followed to step 1020, in which the status light 54 blinks three times slowly and then turns off. Step 1020 is followed by the "END" step 1010. If the time-out period has not expired, the "NO" loops from step 1018 to step 1014, and routine 1000 loops through steps 1014 through 1018 until the user enters the number of digits defining a password selection or until the time-out period expires.

Referring again to step 1016, if a valid password selection has been entered, the "YES" branch is followed to step 1022, in which the cradle 10 receives user input to configure (i.e., enter or change) the selected password. In step 1024, once the user has entered a digit, the status light 54 begins blinking quickly to indicate that a password has been partially entered into the cradle 10.

In step 1026, the cradle 10 determines whether the number of digits defining a valid password has been entered. If the number of digits defining a valid a password has not been entered, the "NO" branch is followed to step 1028, in which the cradle 10 determines whether a time-out period has expired. If the time-out period has not expired, the "NO" branch loops to step 1024, and the status light 54 continues to blink quickly until the user enters the number of digits defining a valid password or until the time-out period expires. If the time-out period has expired, the "YES" branch is followed to step 1020, in which the status light 54 blinks three times slowly to indicate that the password has been rejected. Step 1020 is followed by the "END" step 1010, which returns to step 916 shown on FIG. 9.

Referring again to step 1026, if the number of digits defining a valid password has been received, the "YES" branch is followed to step 1030, in which the cradle 10 determines whether the password is valid. If the password is not valid, the "NO" branch is followed to step 1020, in which the status light 54 blinks three times slowly to indicate that the password has been rejected. Step 1020 is followed by the "END" step 1010, which returns to step 916.

Referring again to step 1030, if the password is valid, the "YES" branch is followed from step to step 1032, in which the new password configuration is stored in the EEPROM 275. Step 1032 is followed to step 1034, in which the cradle determines whether the user has entered a quit command. The cradle 10 is preferably configured to recognize the simultaneous depression of any three keys of the keypad 48 as a quit command. If the user has entered a quit command, the "YES" branch is followed to the "END" step 1010, which returns to step 916 shown on FIG. 9. If the user has not entered a quit command, the "NO" branch loops to step 1014, in which the user may configure another password or configure another parameter of the cradle 10.

The invention thus provides a cradle for a wireless terminal that eliminates multi-pin cable connectors between the cradle and the wireless terminal and avoids the need for an added-on receptacle mounted on the back of the wireless terminal. The cradle includes a bracket-and-leveling-tray restraining system that allows the wireless terminal to be installed and removed with one hand using an ergonomically safe push-down-and-tilt motion. The cradle can include up to four mechanisms for unlocking the leveling tray, including a manual key lock that may operate the lock if another component of the locking system fails. It should be understood that the foregoing relates only to specific embodiments of the invention, and that numerous changes may be made therein without departing from the spirit and scope of the invention as defined by the following claims.

What is claimed is:

1. A cradle for holding a device, comprising:

a bracket for holding the device in the cradle;

a restraining member comprising a leveling tray for resiliently supporting a second side of the held device, opposite the first side of the held device, the leveling tray movable from an open position to a closed position, so that the held device may be removed from the cradle when the leveling tray is in the open position, and so that the held device is resiliently restrained in the cradle when the leveling tray is in the closed position;

a lock movable from a release position to an interference position to positively restrain the held device in the cradle; and an unlocking means for selectively moving the lock from the interference position to the release position to allow the held device to be removed from the cradle.

2. The cradle of claim 1, wherein:

the bracket includes two spaced-apart retainers for receiving a first side of the held device.

3. The cradle of claim 2, further comprising:

a dog for automatically locking the cradle when the held device is installed in the cradle, and for automatically maintaining the lock in the release position when the held device is not in the cradle.

4. The cradle of claim 3, further comprising:

a battery charger for charging a battery within the held device when the held device is in the cradle.

5. The cradle of claim 4, further comprising:

a communication link for transmitting information between the held device and the cradle when the held device is in the cradle.

6. The cradle of claim 5, wherein the communication link comprises an optical communication link between the cradle and the held device.

7. The cradle of claim 1, further comprising:

a support arm coupled to the bracket for a holding a keyboard; and a communication link functionally connecting the keyboard and the held device when the held device is in the cradle.

8. The cradle of claim 7, further comprising:

a hinge between the support arm and the bracket for articulating the support arm relative to the bracket between a lowered position and a raised position;

a brake for selectively maintaining the support arm in the raised position; and a release for returning the support arm to the lowered position.

9. The cradle of claim 1, wherein the unlocking means comprises:

a return spring for urging the lock into the interference position; and a key-lock for manually moving the lock against the return spring and into the release position.

10. The cradle of claim 9, wherein the unlocking means further comprises:

an actuator for selectively moving the lock against the return spring into the release position; and a trigger for activating the actuator in response to a user command.

11. The cradle of claim 10, wherein the trigger comprises:

a memory for storing a predefined password;

an input device for receiving an entry code; and a processor, coupled to the memory and the input device, for activating the actuator in response to the received entry code matching the predefined password.

12. The cradle of claim 11, wherein the input device comprises a keypad located on the cradle.

13. The cradle of claim 11, wherein the input device comprises a keyboard supported by and functionally connected to the cradle.

14. The cradle of claim 11, wherein the input device comprises a touch-sensitive receptor located on the held device.

15. The cradle of claim 11, wherein the input device comprises a program module resident on the held device that may be operated via a remote computer terminal by way of wireless communication with the held device.

16. The cradle of claim 12, further comprising a second input device including a keyboard supported by and functionally connected to the cradle.

17. The cradle of claim 16, further comprising a third input device including a program module resident on the held device that may be operated via:

the keyboard;

a touch-sensitive receptor located on the held device, or a remote computer terminal by way of wireless communication with the held device.

18. A cradle for holding a wireless terminal, comprising:

a bracket for holding the wireless terminal in the cradle;

a lock movable from an interference position to a release position for positively restraining the wireless terminal in the cradle when the lock is in the interference position, and for allowing the wireless terminal to be removed from the cradle when the lock is in the release position;

a battery charger for charging a battery within the wireless terminal when the wireless terminal is in the cradle;

an optical interface for transmitting information between the wireless terminal and the cradle when the wireless terminal is in the cradle.

19. A cradle for holding a wireless terminal, comprising:

a bracket for holding the wireless terminal in the cradle;

a lock movable from an interference position to a release position for positively restraining the wireless terminal in the cradle when the lock is in the interference position, and for allowing the wireless terminal to be removed from the housing when the lock is in the release position;

means for automatically moving the lock into the interference position when the wireless terminal is entered into the housing;

electric unlocking means for responding to a password by moving the lock into the release position; and manual unlocking means for moving the lock into the release position.

20. A cradle for holding a wireless terminal, comprising:

a bracket including two spaced-apart retainers for receiving a first side of the wireless terminal;

a leveling tray movable in relation to the bracket from a retracted position to an extended position for supporting a second side of the wireless terminal opposite the first side of the wireless terminal;

a lock movable from an interference position to a release position for selectively preventing movement of the leveling tray from the extended position to the retracted position, the lock positioned relative to the leveling tray and the bracket so that, when the lock is in the interference position and the wireless terminal is in the cradle, the wireless terminal is positively restrained in the cradle, and when the lock is in the release position and the wireless terminal is in the cradle, the wireless terminal is resiliently restrained in the cradle so that the leveling tray may be moved from the extended position to the retracted position to allow removal of the wireless terminal from the cradle;

a dog for automatically locking the cradle when the wireless terminal is installed in the cradle, and for automatically maintaining the lock in the release position when the wireless terminal is not in the cradle; and an unlocking means for selectively moving the lock from the interference position to the release position when the wireless terminal is in the cradle.

* * * * *